US 8,775,009 B2

(12) United States Patent
Park et al.

(10) Patent No.: US 8,775,009 B2
(45) Date of Patent: Jul. 8, 2014

(54) FAULT DETECTOR AND FAULT DETECTION METHOD FOR ATTITUDE CONTROL SYSTEM OF SPACECRAFT

(75) Inventors: Chan Gook Park, Seoul (KR); Jun Han Lee, Seoul (KR); Won Hee Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 686 days.

(21) Appl. No.: 12/946,882

(22) Filed: Nov. 16, 2010

(65) Prior Publication Data

US 2012/0053780 A1    Mar. 1, 2012

(30) Foreign Application Priority Data

Aug. 31, 2010    (KR) .................. 10-2010-0084715

(51) Int. Cl.
| | | |
|---|---|---|
| *G01M 17/00* | (2006.01) | |
| *B64G 1/24* | (2006.01) | |
| *B64G 1/26* | (2006.01) | |
| *B64G 1/28* | (2006.01) | |

(52) U.S. Cl.
CPC .. *B64G 1/24* (2013.01); *B64G 1/26* (2013.01); *B64G 1/283* (2013.01)
USPC ...................................................... 701/29.7

(58) Field of Classification Search
CPC ............. B64G 1/24; B64G 1/26; B64G 1/283
USPC ........................ 701/13, 29.7, 531, 534–535; 342/357.58
See application file for complete search history.

(56) References Cited

U.S. PATENT DOCUMENTS

| | | |
|---|---|---|
| 6,128,555 A | 10/2000 | Hanson et al. |
| 6,515,618 B1 | 2/2003 | Lupash |
| 6,535,833 B1 | 3/2003 | Syrjarinne |
| 6,757,858 B1 | 6/2004 | Flammang |
| 2003/0149529 A1 | 8/2003 | Heatwole et al. |
| 2006/0074558 A1* | 4/2006 | Williamson et al. .......... 701/213 |
| 2008/0270027 A1 | 10/2008 | Stecko et al. |

OTHER PUBLICATIONS

Wei Xue and Ying Qing Guo, Application of Kalman Filters for the Fault Diagnoses of Aircraft Engine, May 2010.*
Nader Meskin, Fault Detection and Isolotion of Actuator Faults in Spacecraft Formation Flight, 2006.*
Kenneth A. Fisher, "Multiple Model Adaptive Estimation with Filter Spawning", Jul. 2002, IEEE.*
Youmin Zhang, "Detection and Diagnosis of Sensor and Actuator Failures Using IMM Estimator", Oct. 1998, IEEE.*

* cited by examiner

*Primary Examiner* — Helal A Algahaim
*Assistant Examiner* — Nga X Nguyen
(74) *Attorney, Agent, or Firm* — Harness, Dickey & Pierce, PLC

(57) ABSTRACT

Provided are a fault detector and a fault detection method for an attitude control system (ACS) of a spacecraft. The fault detector includes a first interacting multiple model (IMM) fault detection block for generating a normal model filter of the plurality of actuators and a plurality of upper level filters including fault model filters corresponding to the respective actuators, and detecting faults of the plurality of actuators using an IMM estimation technique from the plurality of upper level filters, and a second IMM fault detection block for generating a plurality of lower level filters each including a fault type model filter of the fault-detected actuator in the first IMM fault detection block, and detecting a fault type of the failed actuator using the IMM estimation technique.

8 Claims, 10 Drawing Sheets
(4 of 10 Drawing Sheet(s) Filed in Color)

FAULT DETECTOR AND FAULT DETECTION METHOD FOR ATTITUDE CONTROL SYSTEM OF SPACECRAFT

CROSS-REFERENCE TO RELATED APPLICATION

This application claims the benefit under 35 U.S.C. §119 (a) of Korean Patent Application No. 10-2010-0084715, filed on Aug. 31, 2010, in the Korean Intellectual Property Office, the entire disclosure of which is incorporated by reference for all purposes.

BACKGROUND

1. Field

The present invention relates to a spacecraft, and more particularly, to a fault detector and a fault detection method for an attitude control system (ACS) of a spacecraft.

2. Description of the Related Art

In general, it is difficult for a ground control center to diagnose and detect faults of spacecrafts including satellites that orbit the earth, and space probes that explore the space outside of the earth's orbit. Therefore, the spacecraft requires a fault detection, isolation and recovery (FDIR) system installed therein.

In order for the spacecraft to stably carry out tasks thereof, an attitude of the spacecraft must be accurately controlled according to the tasks. The attitude of the spacecraft is controlled by an ACS installed in the spacecraft. The ACS installed in the spacecraft uses an attitude sensor that measures an attitude of the spacecraft and an actuator that changes the attitude of the spacecraft. For this reason, if the fault cannot be rapidly detected and isolated from the spacecraft upon occurrence of the fault in the sensor or actuator, the spacecraft cannot carry out the tasks.

A method of detecting a fault of the ACS of the spacecraft generally uses an interacting multiple model (IMM) estimation technique. FIG. 1 schematically shows a conventional actuator-fault detector using the IMM estimation technique, and FIG. 2 schematically shows a conventional sensor-fault detector using the IMM estimation technique.

Referring to FIG. 1, a conventional actuator-fault detector 10 includes a filter part 11 and a fault decision making part 12. The filter part 11 includes model filters corresponding to N fault types with respect to each of M actuators. Referring to FIG. 2, a conventional sensor-fault detector 20 includes a filter part 21 and a fault decision making part 22. The filter part 21 includes a first filter module 21a and a second filter module 21b corresponding to sensor modules, respectively. Each of the filter modules 21a and 21b includes L model filters corresponding to fault types.

As shown in FIGS. 1 and 2, since the conventional sensor- and actuator-fault detectors must have a large number of model filters to recognize the fault types, calculations must also be increased, thereby causing a reduction in fault detection performance. Thus, improvement thereof is required.

SUMMARY

The present invention provides a fault detector and a fault detection method for an ACS of a spacecraft capable of rapidly and accurately detecting faults of an actuator.

The present invention also provides a fault detector and a fault detection method for an ACS of a spacecraft capable of detecting faults of a sensor.

The present invention further provides a fault detector and a fault detection method for an ACS of a spacecraft capable of using fault detection data of the sensor to also detect faults of the actuator.

In order to accomplish the above aspects, in some aspects, there is provided a fault detector for an attitude control system (ACS) of a spacecraft including a plurality of actuators, which includes a first interacting multiple model (IMM) fault detection block for generating a normal model filter of the plurality of actuators and a plurality of upper level filters including fault model filters corresponding to the respective actuators, and detecting faults of the plurality of actuators using an IMM estimation technique from the plurality of upper level filters; and a second IMM fault detection block for generating a plurality of lower level filters each including a fault type model filter of the fault-detected actuator in the first IMM fault detection block, and detecting a fault type of the failed actuator using the IMM estimation technique.

The IMM estimation technique may use a penalty upon calculation of reliability of each model filter.

The plurality of actuators may include four reaction wheels and six pairs of thrusters, and the fault model filters of the respective actuators of the plurality of upper level filters may include fault model filters corresponding to the four reaction wheels and fault model filters corresponding to the six pairs of thrusters.

The plurality of lower level filters may include hard fault model filters and soft fault model filters of the failed actuator.

The spacecraft may include a plurality of sensor modules, and the fault detector may further include a federated Kalman filter (FKF) fault detection block including: a plurality of local filters for receiving data from the plurality of sensor modules to calculate an estimation value of an attitude model of the spacecraft, a prediction filter of an attitude of the spacecraft, a sensitivity factor calculation part for calculating sensitivity factors of the respective local filters using data from the plurality local filters and data from the prediction filter, and a comparison part for comparing the sensitivity factors of the respective local filters. Here, the FKF fault detection block may transmit data of the sensor module used in the local filter having a smallest sensitivity factor to an upper level filter of the first IMM fault detection block.

The first IMM fault detection block may generate a plurality of sensor filters including fault model filters with respect to the respective sensors of the sensor module corresponding to the local filter having a largest sensitivity factor, and the FKF fault detection block may transmit the data of the sensor module used in the local filter having the largest sensitivity factor to the plurality sensor filters, and detect a fault of the sensor using the sensitivity factor and the data from the plurality of sensor filters.

The sensor module may include an X-axis gyro, a Y-axis gyro and a Z-axis gyro, and the plurality of sensor filters may include a fault model filter of the X-axis gyro, a fault model filter of the Y-axis gyro, and a fault model filter of the Z-axis gyro.

In still other general aspects, there is provided a fault detection method for an attitude control system (ACS) of a spacecraft including a plurality of actuators, which includes a first actuator-fault detection operation of generating a normal model filter of the plurality of actuators and a plurality of upper level filters including fault model filters corresponding to the respective actuators, and detecting faults of the plurality of actuators using an interacting multiple model (IMM) estimation technique; and a second actuator-fault detection operation of generating a plurality of lower level filters corresponding to fault types of the fault-detected actuators in the first actuator-fault detection operation, and detecting the fault type of the failed actuator using the IMM estimation technique.

The IMM estimation technique may use a penalty upon calculation of the respective model filters.

The spacecraft may include a plurality of sensor modules, and the method may include a first sensor-fault detection operation of receiving data from the plurality of sensor modules to calculate estimation values of attitude models of the spacecraft and a prediction value of an attitude of the spacecraft, and calculating and comparing sensitivity factors of the respective estimation values using the values; and a second sensor-fault detection operation of generating a fault model filter of each sensor of the sensor module used to calculate the estimation value having a largest sensitivity factor, and detecting a fault of an individual sensor using the IMM estimation technique on the basis of data of the sensor module used to calculate the estimation value having the largest sensitivity factor.

The data of the sensor module used to calculate the estimation value having the smallest sensitivity factor among the sensitivity factors may be transmitted to the first actuator-fault detection operation.

Other features will become apparent to those skilled in the art from the following detailed description, which, taken in conjunction with the attached drawings, discloses exemplary embodiments of the invention.

BRIEF DESCRIPTION OF THE DRAWINGS

The file of this patent or application file contains at least one drawing executed in color. Copies of this patent or patent application publication with color drawings will be provided by the Patent and Trademark Office upon request and payment of necessary fee.

FIGS. 9 and 10 are graphs showing simulation results of actuator-fault detection using the fault detector shown in FIG. 5a;

FIGS. 12, 13 and 14 are graphs showing simulation results of sensor-fault detection using the fault detector shown in FIG. 5a.

DETAILED DESCRIPTION

Figure 1:
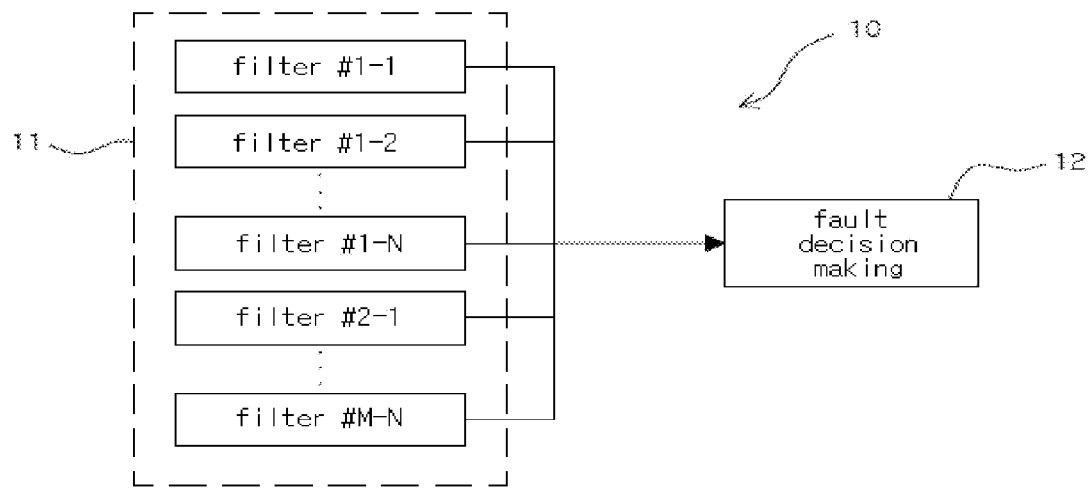
FIG. 1 is a schematic view of a conventional satellite actuator-fault detector using an IMM estimation technique.
Figure 2:
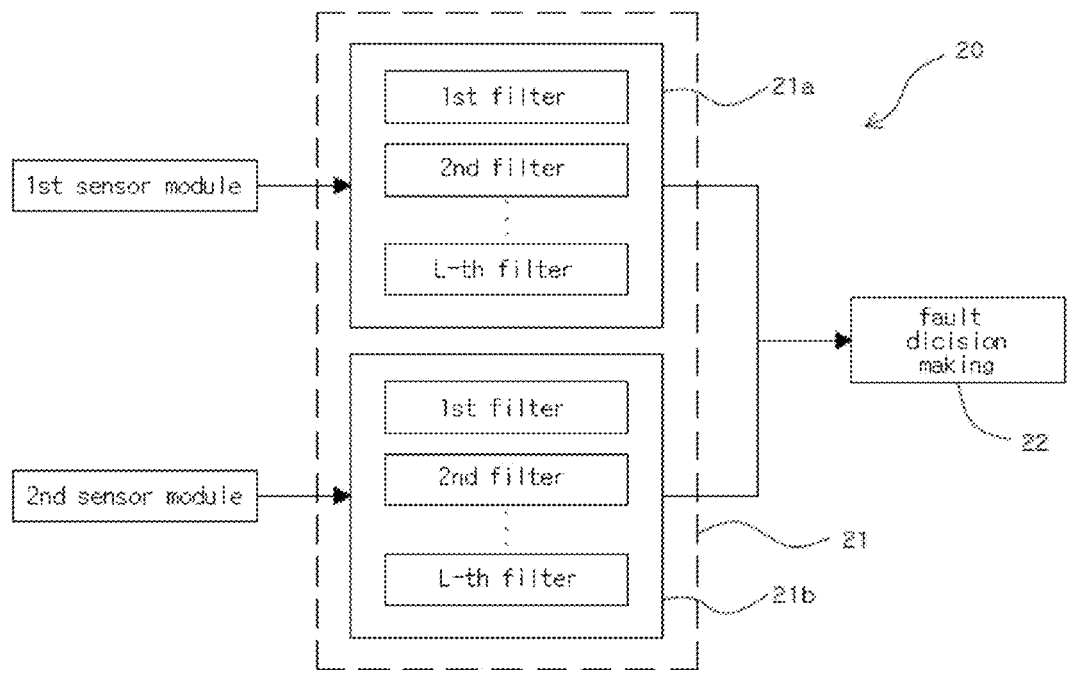
FIG. 2 is a schematic view of a conventional satellite sensor-fault detector using an IMM estimation technique.

Hereinafter, configuration and effects of an embodiment in accordance with the present invention will be described in detail with reference to the accompanying drawings. While the embodiment illustrates a satellite as an example of a spacecraft, the spacecraft is not limited to the satellite.

First, an attitude model equation of a satellite using a reaction wheel and a thruster as an actuator is induced. A dynamic model of the satellite using the reaction wheel and the thruster is basically provided in a non-linear type. In order to form the dynamic attitude model equation of the satellite, an equation including a three-dimensional Euler equation, a gyroscopic torque of the reaction wheel, and an absolute torque of the reaction wheel and the thruster will be represented as the following equations 1 to 3.

$$I_g \dot{\underline{\omega}} = -\underline{\omega} \times (I_t \underline{\omega} + L^T I_w \underline{\Omega}) - L^T \underline{\tau}_w + \underline{\tau}_{thruster} + \underline{\tau}_{gravity} + \underline{\tau}_{aero} + \underline{\tau}_{magnetic} + \underline{\tau}_{srp}$$ [equation 1]

$$\dot{\underline{h}}_w = \underline{\tau}_w$$ [equation 2]

$$\underline{h}_w = I_w \underline{\Omega} + I_w L \underline{\omega}$$ [equation 3]

In Equations 1 to 3, $I_t$ represents moment of inertia of the entire satellite, and $I_g$ represents a difference between the entire moment of inertia of the satellite and moment of inertia of the reaction wheel, and thus, $I_g = I_t - L^T I_\omega$. L represents an input distribution matrix of the wheel determined according to the arrangement of the reaction wheel, $\omega$ represents an angular velocity vector of three axes of the satellite, $\Omega$ represents a velocity vector of the reaction wheel, and $\underline{h}_w$ represents an angular momentum of the reaction wheel. In addition, in Equation 1, a first term of a right side is a three-dimensional Euler equation, a second term of the right side is a term representing a gyroscopic torque of the reaction wheel of the satellite, and third and fourth terms are absolute torques of the reaction wheel and the thruster. The other terms represent disturbances that affect the satellite.

Differentiating Equation 3 representing the angular momentum of the reaction wheel with respect to time, a velocity vector differentiation equation of the reaction wheel may be represented as the following equation 4.

$$\dot{\underline{\Omega}} = I_w^{-1} \underline{\tau}_w - L\underline{\omega}$$ [equation 4]

Substituting Equation 1 into Equation 4 and provided that the satellite is in the deep space, since the satellite is far from Earth, and thus there is no disturbance to the satellite due to air and gravity as there would be on earth, a movement equation of the reaction wheel and a dynamic attitude model equation of the satellite may be finally induced as the following equations 5 and 6.

$$\dot{\underline{\Omega}} = I_w^{-1} \underline{\tau}_w + L[I_g^{-1} \underline{\omega} \times (I_t \underline{\omega} + L^T I_w \underline{\Omega}) + I_g^{-1} L \underline{\tau}_w]$$ [equation 5]

$$I_g \dot{\underline{\omega}} = -\underline{\omega} \times (I_t \underline{\omega} + L^T I_w \underline{\Omega}) - L^T \underline{\tau}_w + \underline{\tau}_{thruster}$$ [equation 6]

In addition, a coordinate conversion equation is needed to represent the attitude control. In this embodiment, a relationship between a local vertical local horizontal (LVLH) navigation coordinate system and a body fixed frame (BFC) coordinate system is used. A pitch θ-yaw ψ-roll φ coordinate conversion matrix is represented as the following equation 7 using an Euler angle.

$$\begin{bmatrix} x \\ y \\ z \end{bmatrix}_{BFC} = \begin{bmatrix} \cos\psi\cos\theta & \sin\psi & -\cos\psi\sin\theta \\ -\cos\phi\sin\psi\cos\theta - \sin\phi\sin\theta & \cos\phi\cos\psi & \cos\phi\sin\psi\sin\phi - \sin\phi\cos\theta \\ \sin\phi\sin\psi\cos\theta + \cos\phi\sin\theta & -\sin\phi\cos\psi & -\sin\phi\sin\psi\sin\theta + \cos\phi\cos\theta \end{bmatrix} \begin{bmatrix} x \\ y \\ z \end{bmatrix}_{LFLH}$$

[equation 7]

The relation between the angular velocity and the time rate of change of the Euler angle is represented as the following equation 8.

$$\begin{bmatrix} \dot{\phi} \\ \dot{\theta} \\ \dot{\psi} \end{bmatrix} = \frac{1}{\cos\psi} \begin{bmatrix} \cos\psi & -\cos\phi\sin\psi & \sin\phi\sin\psi \\ 0 & \cos\phi & -\sin\phi \\ 0 & \sin\phi\cos\psi & \cos\phi\cos\psi \end{bmatrix} \begin{bmatrix} \omega_x \\ \omega_y \\ \omega_z \end{bmatrix}$$

[equation 8]

Figure 3:
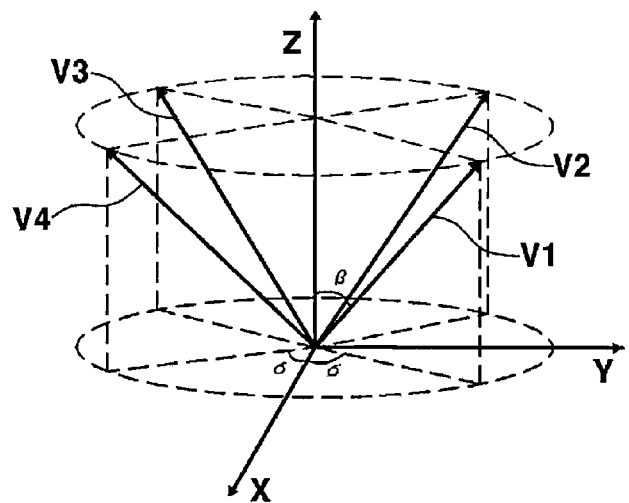
FIG. 3 shows the arrangement of four reaction wheels installed at a satellite to which a fault detector of a spacecraft actuator in accordance with an exemplary embodiment of the present invention is applied.

In this embodiment, a satellite in which a thruster and four reaction wheels including extra hardware are installed is considered. An input distribution matrix L is determined depending on a mounting type of the wheels, and each column of the matrix L represents affection of the torque of the wheel to the satellite. In this embodiment, four reaction wheels are disposed in a conical shape. In general, in order to maximize control performance of the reaction wheels, the four wheels are disposed in the conical shape. When the reaction wheels are disposed in this shape, the input distribution matrix L is represented as the following equation 9. In FIG. 3, an x-y-z coordinate system represents standard coordinates of the satellite, and reference numerals v1, v2, v3 and v4 represent torque vectors of first, second, third and fourth reaction wheels, respectively. If one wheel malfunctions, it is possible to minimize power consumption when β is 54° and σ is 45°.

$$L = \begin{bmatrix} \sin\beta\cos\sigma & \sin\beta\sin\sigma & \cos\beta \\ -\sin\beta\cos\sigma & \sin\beta\sin\sigma & \cos\beta \\ -\sin\beta\cos\sigma & -\sin\beta\sin\sigma & \cos\beta \\ \sin\beta\cos\sigma & -\sin\beta\sin\sigma & \cos\beta \end{bmatrix}$$

[equation 9]

Figure 4:
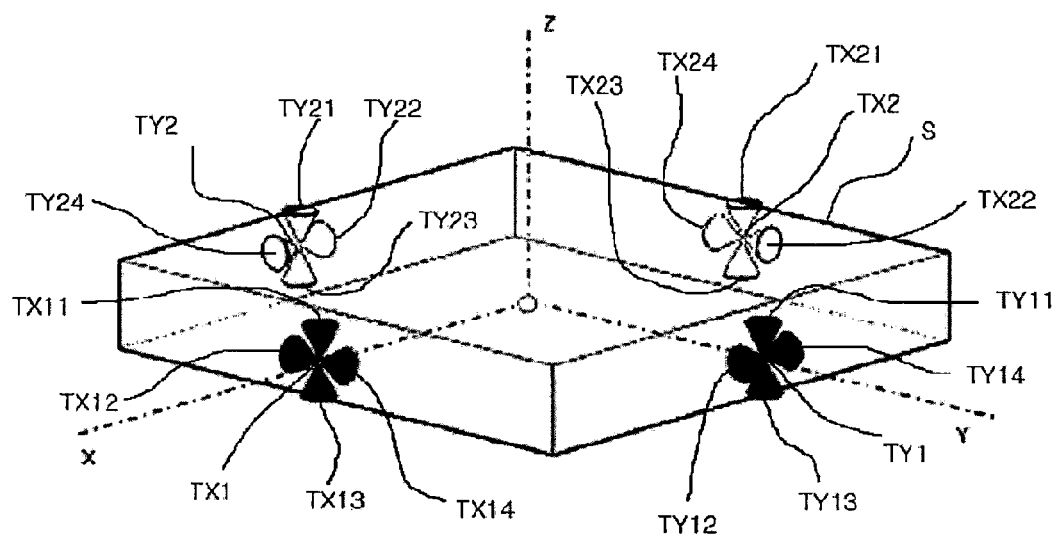
FIG. 4 shows the arrangement of a plurality of thrusters installed at the satellite to which the fault detector of the spacecraft actuator in accordance with the exemplary embodiment of the present invention is applied.

In this embodiment, the four reaction wheels and a plurality of thrusters are used to control the attitude of the satellite. The plurality of thrusters are generally constituted to control the three-axis attitude of the satellite as shown in FIG. 4. Referring to FIG. 4, the satellite S includes first and second X-axis thruster modules TX1 and TX2 disposed at both sides of the center thereof along an X-axis, and first and second Y-axis thruster modules TY1 and TY2 disposed at both sides of the center thereof along a Y-axis. The first X-axis thruster module TX1 includes two thrusters TX12 and TX14 installed along the Y-axis in opposite directions, and two thrusters TX11 and TX13 installed along a Z-axis in opposite directions. The second X-axis thruster module TX2 includes two thrusters TX22 and TX24 installed along the Y-axis in opposite directions, and two thrusters TX21 and TX23 installed along the Z-axis in opposite directions. The first Y-axis thruster module TY1 includes two thrusters TY12 and TY14 installed along the X-axis in opposite directions, and two thrusters TY11 and TY13 installed along the Z-axis in opposite directions. The second Y-axis thruster module TY2 includes two thrusters TY22 and TY24 installed along the X-axis in opposite directions, and two thrusters TY21 and TY23 installed along the Z-axis in opposite directions.

The thrusters can control both orbit change and attitude conversion, unlike the reaction wheels. However, the two thrusters must be simultaneously operated as a pair to perform only the attitude conversion. That is, the attitude conversion can be performed by generation of couple force, without the orbit change, under the condition that the thrusters symmetrically disposed with respect to the center of the satellite are simultaneously operated to the same magnitude.

Hereinafter, configuration of an extended Kalman filter (EKF) for estimating a system state will be described. An attitude equation of the satellite is basically non-linear. The Kalman filter is a linear estimator that estimates a current value on the basis of a value estimated at a previous time. When the estimator is used in a non-linear system, a process of approximating it to a linear model must be added. In this process, a difference between a mathematical model and an actual system becomes larger. Considering that the ACS of the satellite is a complex non-linear system, it becomes a major problem. Therefore, in this embodiment, the EKF is used. In order to induce a matrix A of the EKF, a Jacobian matrix is obtained using Equations 5 to 7.

$$\dot{x} = \left(\frac{\partial f}{\partial x'}\right)x + \left(\frac{\partial f}{\partial u'}\right)u$$

[equation 10]

$$\underline{x} = [\phi,\theta,\psi,\omega_x,\omega_y,\omega_z,\Omega_1,\Omega_2,\Omega_3,\Omega_4]^T = [\underline{\phi_e},\underline{\omega},\underline{\Omega}]^T$$

[equation 11]

$$\underline{u} = [\tau_{w1}\ \tau_{w2}\ \tau_{w3}\ \tau_{w4}\ \tau_{x\text{-}thrust}\ \tau_{y\text{-}thrust}\ \tau_{z\text{-}thrust}]^T$$

[equation 12]

The number of state variables is ten including three attitudes, three angular velocities, and four velocities of the reaction wheels of the satellite. In addition, the number of input terms is seven including three about the absolute torque of the thruster and four about the absolute torque of the reaction wheel of the satellite. $I_\omega$ and $I_t$ are defined as follows.

$$I_w = \begin{bmatrix} I_{w1} & 0 & 0 & 0 \\ 0 & I_{w2} & 0 & 0 \\ 0 & 0 & I_{w3} & 0 \\ 0 & 0 & 0 & I_{w4} \end{bmatrix}$$

[equation 13]

$$I_t = \begin{bmatrix} I_x & 0 & 0 \\ 0 & I_y & 0 \\ 0 & 0 & I_z \end{bmatrix}$$

[equation 14]

Therefore, matrices A and B are obtained as follows.

$$\frac{d}{dt}\begin{bmatrix} \phi \\ \theta \\ \psi \\ \omega_x \\ \omega_y \\ \omega_z \\ \Omega_1 \\ \Omega_2 \\ \Omega_3 \\ \Omega_4 \end{bmatrix} = A \begin{bmatrix} \phi \\ \theta \\ \psi \\ \omega_x \\ \omega_y \\ \omega_z \\ \Omega_1 \\ \Omega_2 \\ \Omega_3 \\ \Omega_4 \end{bmatrix} + B \begin{bmatrix} \tau_w \\ \tau_{thruster} \end{bmatrix}$$

[equation 15]

$$A = \begin{bmatrix} A_{11} & A_{12} & O_{3\times 4} \\ O_{3\times 3} & A_{22} & A_{23} \\ O_{4\times 3} & A_{32} & A_{33} \end{bmatrix}$$

[equation 16]

$$B = \begin{bmatrix} O_{3\times 4} & 3_{3\times 3} \\ -I_g^{-1}L^T & I^{-1} \\ I_w^{-1} + LI_g^{-1}L^T & -LI_g^{-1} \end{bmatrix}$$

[equation 17]

$$A_{11} = \begin{bmatrix} \sin_\phi \tan_\psi \omega_y & 0 & \dfrac{-\cos_\phi \omega_y}{\cos^2 \psi} + \dfrac{\sin_\phi \omega_z}{\cos^2 \psi} \\ \dfrac{-\sin_\phi \omega_y}{\cos_\psi} - \dfrac{\cos_\phi \omega_z}{\cos_\psi} & 0 & \dfrac{-\sin_\phi \cos_\psi + \cos_\phi \sin_\psi}{\cos^2 \psi}\omega_y - \dfrac{\cos_\phi \cos_\psi + \sin_\phi \sin_\psi}{\cos^2 \psi}\omega_z \\ \cos_\phi \omega_x - \sin_\phi \omega_z & 0 & 0 \end{bmatrix}$$

[equation 18]

$$A_{12} = \begin{bmatrix} 1 & -\cos\phi \tan\psi & \sin\phi\tan\psi \\ 0 & \dfrac{\cos\phi}{\cos\psi} & -\dfrac{\sin\phi}{\cos\psi} \\ \sin\phi & 0 & \cos\phi \end{bmatrix}$$

[equation 19]

$$A_{22} = I_g^{-1}\begin{bmatrix} 0 & A_{22-12} & A_{22-13} \\ A_{22-21} & 0 & A_{22-23} \\ A_{22-31} & A_{22-32} & 0 \end{bmatrix}$$

[equation 20]

$A_{22-12} = \omega_z I_y - (I_z\omega_z + L_{(1,3)}I_{w1}\Omega_1 - L_{(2,3)}I_{w2}\Omega_2 + L_{(3,3)}I_{w3}\Omega_3 + L_{(4,3)}I_{w4}\Omega_4)$ $A_{22-13} = -\omega_y I_z + (I_y\omega_y + L_{(1,2)}I_{w1}\Omega_1 + L_{(2,2)}I_{w2}\Omega_2 + L_{(3,2)}I_{w3}MEGA_3 + L_{(4,2)}I_{w4}\Omega_4)$ $A_{22-21} = -\omega_z I_x - (I_z\omega_z + L_{(1,3)}I_{w1}\Omega_1 + L_{(2,3)}I_{w2}\Omega_2 + L_{(3,3)}I_{w3}\Omega_3 + L_{(4,3)}I_{w4}\Omega_4)$ $A_{22-23} = \omega_x I_z - (I_x\omega_x + L_{(1,1)}I_{w1}\Omega_1 + L_{(2,1)}I_{w2}\Omega_2 + L_{(3,1)}I_{w3}\Omega_3 + L_{(4,1)}I_{w4}\Omega_4)$ $A_{22-31} = \omega_y I_x - (I_y\omega_y + L_{(1,2)}I_{w1}\Omega_1 + L_{(2,2)}I_{w2}\Omega_2 + L_{(3,2)}I_{w3}\Omega_3 + L_{(4,2)}I_{w4}\Omega_4)$ $A_{22-32} = -\omega_x I_y + (I_x\omega_x + L_{(1,1)}I_{w1}\Omega_1 + L_{(2,1)}I_{w2}\Omega_2 + L_{(3,1)}I_{w3}MEGA_3 + L_{(4,1)}I_{w4}\Omega_4)$ $$A_{23} = I_g^{-1}\begin{bmatrix} \omega_z L_{(1,2)}I_{w1} - \omega_y L_{(1,3)}I_{w1} & \omega_z L_{(2,2)}I_{w2} - \omega_y L_{(2,3)}I_{w2} & \omega_z L_{(3,2)}I_{w3} - \omega_y L_{(3,3)}I_{w3} & \omega_z L_{(4,2)}I_{w4} - \omega_y L_{(4,3)}I_{w4} \\ -\omega_z L_{(1,1)}I_{w1} + \omega_x L_{(1,3)}I_{w1} & -\omega_z L_{(2,1)}I_{w2} - \omega_x L_{(2,3)}I_{w2} & -\omega_z L_{(3,1)}I_{w3} - \omega_x L_{(3,3)}I_{w3} & -\omega_z L_{(4,1)}I_{w4} - \omega_x L_{(4,3)}I_{w4} \\ \omega_y L_{(1,1)}I_{w1} - \omega_x L_{(1,2)}I_{w1} & \omega_y L_{(2,1)}I_{w2} - \omega_x L_{(2,2)}I_{w2} & \omega_y L_{(3,1)}I_{w3} - \omega_x L_{(3,2)}I_{w3} & \omega_y L_{(4,1)}I_{w4} - \omega_x L_{(4,2)}I_{w4} \end{bmatrix}$$

[equation 21]

$$A_{32} = -L \times I_g^{-1}\begin{bmatrix} 0 & A_{32-12} & A_{32-13} \\ A_{32-21} & 0 & A_{32-23} \\ A_{32-31} & A_{32-32} & 0 \end{bmatrix}$$

[equation 22]

$A_{32-12} = \omega_z I_y - (I_z\omega_z + L_{(1,3)}I_{w1}\Omega_1 + L_{(2,3)}I_{w2}\Omega_2 + L_{(3,3)}I_{w3}\Omega_3 + L_{(4,3)}I_{w4}\Omega_4)$ $A_{32-13} = -\omega_y I_z + (I_y\omega_y + L_{(1,2)}I_{w1}\Omega_1 + L_{(2,2)}I_{w2}\Omega_2 - L_{(3,2)}I_{w3}MEGA_3 + L_{(4,2)}I_{w4}\Omega_4)$ $A_{32-21} = -\omega_z I_x - (I_z\omega_z + L_{(1,3)}I_{w1}\Omega_1 + L_{(2,3)}I_{w2}\Omega_2 + L_{(3,3)}I_{w3}\Omega_3 + L_{(4,3)}I_{w4}\Omega_4)$ $A_{32-23} = \omega_x I_z - (I_x\omega_x + L_{(1,1)}I_{w1}\Omega_1 + L_{(2,1)}I_{w2}\Omega_2 + L_{(3,1)}I_{w3}\Omega_3 + L_{(4,1)}I_{w4}\Omega_4)$ $A_{32-31} = \omega_y I_x - (I_y\omega_y + L_{(1,2)}I_{w1}\Omega_1 + L_{(2,2)}I_{w2}\Omega_2 + L_{(3,2)}I_{w3}\Omega_3 + L_{(4,2)}I_{w4}\Omega_4)$ $A_{32-32} = -\omega_x I_y + (I_x\omega_x + L_{(1,1)}I_{w1}\Omega_1 + L_{(2,1)}I_{w2}\Omega_2 + L_{(3,1)}I_{w3}MEGA_3 + L_{(4,1)}I_{w4}\Omega_4)$ $$A_{33} = -L \times I_g^{-1}\begin{bmatrix} \omega_z L_{(1,2)}I_{w1} - \omega_y L_{(1,3)}I_{w1} & \omega_z L_{(2,2)}I_{w2} - \omega_y L_{(2,3)}I_{w2} & \omega_z L_{(3,2)}I_{w3} - \omega_y L_{(3,3)}I_{w3} & \omega_z L_{(4,2)}I_{w4} - \omega_y L_{(4,3)}I_{w4} \\ -\omega_z L_{(1,1)}I_{w1} + \omega_x L_{(1,3)}I_{w1} & -\omega_x L_{(2,1)}I_{w2} + \omega_x L_{(2,3)}I_{w2} & -\omega_z L_{(3,1)}I_{w3} + \omega_x L_{(3,2)}I_{w3} & -\omega_z L_{(4,1)}I_{w4} + \omega_x L_{(4,3)}I_{w41} \\ \omega_y L_{(1,1)}I_{w1} - \omega_x L_{(1,2)}I_{w1} & \omega_y L_{(2,1)}I_{w2} - \omega_x L_{(2,2)}I_{w2} & \omega_y L_{(3,1)}I_{w3} - \omega_x L_{(3,2)}I_{w3} & \omega_y L_{(4,1)}I_{w4} - \omega_x L_{(4,2)}I_{w4} \end{bmatrix}$$

[equation 23]

Hereinafter, a fault modeling of the actuator will be described. In general, faults having occurred in the thrusters and the reaction wheels are generated from a circuit such as a control part. When the fault occurs in the control part, a control order cannot be appropriately performed, and types in which a bias is included, a certain constant is multiplied, etc., may be output. In this case, the types may be modeled into an additive fault and a multiplication fault of the actuator output.

In addition, the wheels may stop due to external great impacts, or propulsion of the thrusters may be less than a desired magnitude.

The most serious fault in the actuator such as the reaction wheel and the thruster is a hard fault in which an operation is completely stopped. When the hard fault occurs from the reaction wheels, even when only one wheel among the four reaction wheels malfunctions, the other three wheels are affected so that attitude control of the satellite is largely affected. In addition, when the hard fault occurs from the thruster, two thrusters must be operated in a pair to perform the attitude conversion. When only one thruster is operated, both the attitude and orbit of the satellite are unintentionally varied.

Even a soft fault, in which the reaction wheel cannot make a desired magnitude of torque or the thruster cannot apply desired propulsion, rather than the hard fault, it also slightly affects the attitude of the satellite. However, since the affection by the fault is accumulated as time elapses, if the fault occurs, rapid and accurate fault detection is needed.

The hard fault of the reaction wheel and the thruster may be modeled into a type in which the reaction wheel shows an output according to the control order and then an output of 0, and the soft fault of the reaction wheel and the thruster may be modeled by reducing the magnitude of the fault to 50% or 25%.

The fault model equations of the faults of the respective four reaction wheels and thrusters may be represented as the following equation 24.

$$x(k+1)=F(k)x(k)+[G(k)+M_j]u(k)+T(k)\xi(k) \qquad \text{[equation 24]}$$

A matrix $M_j$ representing affection by a fault is selectively added to an actuator input matrix G(k). The Matrix $M_j$ is a matrix having other terms constituted by 0, except for $j^{th}$ column, which represents a $j^{th}$ fault model. However, since the fault model equation of Equation 24 adjusts the fault affection using an input vector u(k), it is difficult to detect the fault. Therefore, the $M_j$ matrix of the fault model equation of Equation 24 is represented as a system noise term. When Equation 24 shows that the system noise term is added to the $j^{th}$ actuator fault, Equation 24 can be represented as the following equation 25.

$$x(k+1)=F(k)x(k)+G(k)u(k)+T(k)\xi(k)+\epsilon_j(k) \qquad \text{[equation 25]}$$

Hereinafter, a fault modeling of the sensor will be described. The sensor of the satellite includes a star sensor for obtaining an attitude of the satellite, an inertial sensor for measuring an angular velocity of the satellite, and so on. In general, since a fault probability of a sensor used in an inertial navigation system is very low, when extra sensors are used, simultaneous faults of the sensors cannot easily occur. Therefore, in consideration of characteristics of faults that may occur in the sensor, basic assumption can be performed. The faults of the sensors may appear in various shapes. The most serious fault is the case that the sensor is not operated or does not output due to problems in hardware or communication. In addition, there are faults including the case that the sensor output has an arbitrary bias or a fixed constant output, a type that frequently occurs in an analog sensor and is caused due to a change in temperature and calibration and in which a certain constant is added to the sensor output (referred to as 'drift'), or a type in which an arbitrary value is multiplied to a normal output of the sensor. Therefore, the faults of the sensor may be modeled in the following method. A fault model equation to which a matrix H and a matrix $L_j$ representing a fault of the sensor are selectively added is represented as the following equation 26. Here, $L_j$ is a matrix having other terms constituted by 0, except for the $j^{th}$ column, which represents a $j^{th}$ fault model.

$$z(k)=[H(k)+L_j]x(k)+\eta(k) \qquad \text{[equation 26]}$$

The fault model equation of the sensor may represent the fault as a measured noise term like the actuator fault model again. Equation 26 is a $j^{th}$ sensor fault, to which the measured noise term $e_j(k)$ is added, and may be represented as the following equation 27.

$$z(k)=H(k)x(k)+\eta(k)+e_j(k) \qquad \text{[equation 27]}$$

Hereinafter, a Markov model for fault detection and separation will be introduced. An actual system that varies due to the fault may be modeled by a Markov chain as the following equations 28 and 29.

$$x(k+1)=F(k,m(k+1))x(k)+G(k,m(k+1))u(k)+T(k,m(k+1))\xi(k,m(k+1)) \qquad \text{[equation 28]}$$

$$z(k)=H(k,m(k))x(k)+\eta(k,m(k)) \qquad \text{[equation 29]}$$

x(k) is a state variable vector, z(k) is a measurement vector, and u(k) is a control input vector. In addition, transition probabilities that vary from an initial model to the next model are as the following equations 30 and 31.

$$\pi_{ij}(k) = P\{m_j(k+1) \mid m_i(k)\} \qquad \text{[equation 30]}$$
$$\forall m_i, m_j \in S$$

$$\sum_j \pi_{ij}(k) = 1, i = 1, 2, \ldots, S \qquad \text{[equation 31]}$$

Here, P{ } represents probability, m{k} represents a modal state that indicates a normal mode or a fault mode in a step k, $\pi_{ij}(k)$ represents a transition probability that varies from a mode $m_i$ to a mode $m_j$, and S represents the number of modes.

Figure 5A:
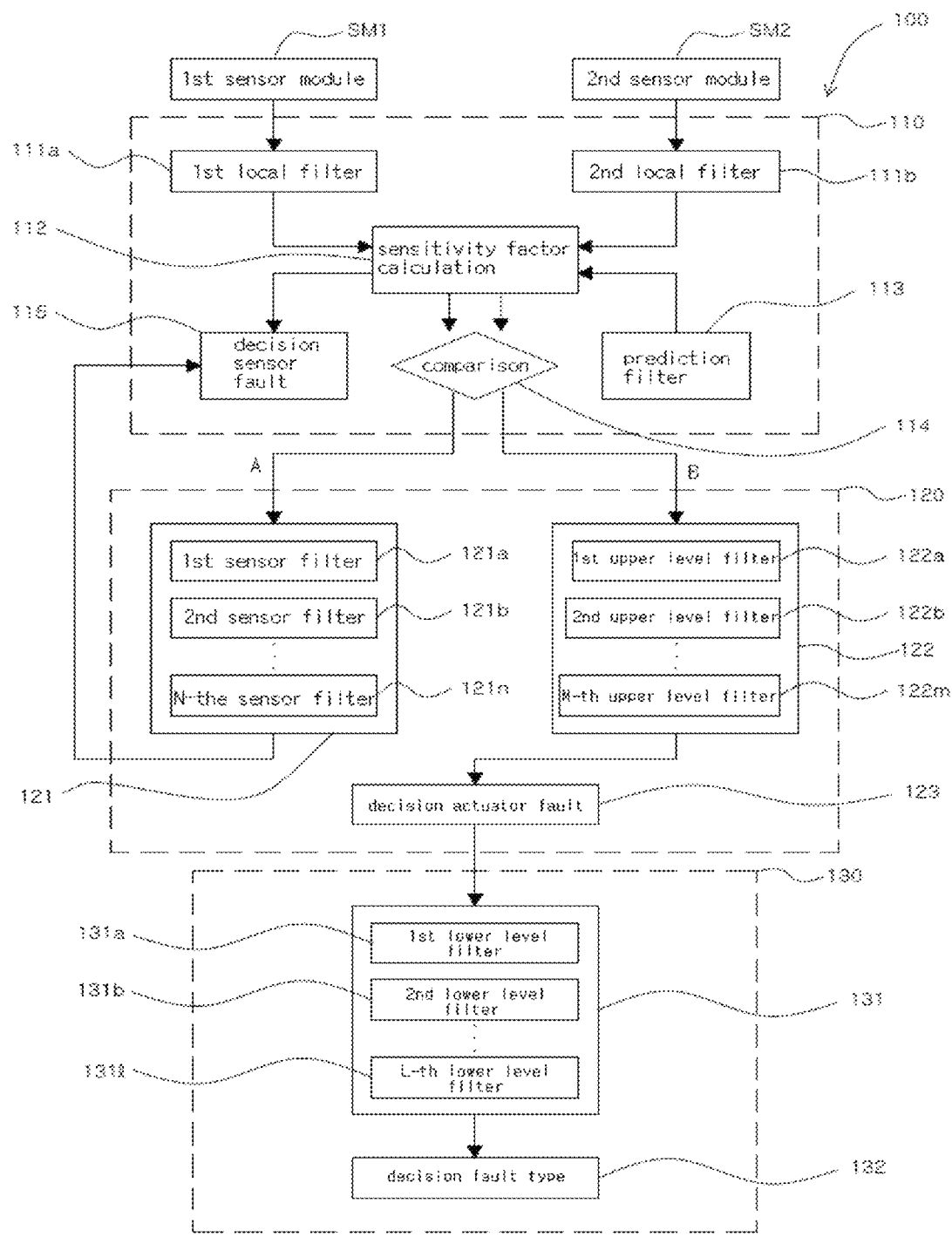
FIG. 5a is a block diagram showing the configuration of a fault detector for an ACS of the spacecraft in accordance with the exemplary embodiment of the present invention.

FIG. 5a is a block diagram showing the configuration of a fault detector for an ACS of a spacecraft in accordance with an exemplary embodiment of the present invention. Referring to FIG. 5a, a fault detector 100 includes a federated Kalman filter (FKF) fault detection block 110, a first IMM fault detection block 120, and a second IMM fault detection block 130.

The FKF fault detection block 110 includes a first local filter 111a, a second local filter 111b, a sensitivity factor calculation part 112, a prediction filter 113, a comparison part 114, and a sensor-fault decision making part 115. The first local filter 111a obtains an estimation value of a satellite attitude model using data of a first sensor module SM1, and the second local filter 111b obtains an estimation value of a satellite attitude model using data of a second sensor module SM2. The prediction filter 113 obtains a prediction value of a satellite attitude model using a non-linear attitude dynamic model of the satellite. The sensitivity factor calculation part 112 calculates a sensitivity factor as fault reliability of the two local filters 111a and 111b using the prediction value from the prediction filter 113 on the basis of the estimation values obtained by the respective local filters 111a and 111b. The sensitivity factors of the first and second local filters 111a and 111b are calculated as the following equation 32.

$$S_i = (\hat{x}_i - \hat{x}_p)^T(P_i + P_p)(\hat{x}_i - \hat{x}_p) \; i = 1, 2 \qquad \text{[equation 32]}$$

The comparison part 114 compares two sensitivity factors, and discriminates data A of the sensor module corresponding to a large sensitivity factor and data B of the sensor module corresponding to a small sensitivity factor to provide them to the first IMM fault detection block 120. The sensor-fault decision making part 115 finally detects which sensor malfunctions on the basis of fault reliability of the two local filters 111a and 111b and probabilities of sensor-fault models provided from the first IMM fault detection block 120, and separates the fault sensor.

In addition, in order to clearly discriminate the two sensitivity factors, $S_i$ accumulated values are used as the following equation 33.

$$W_i = \sum_{i=N}^{N} S_i \quad \text{[equation 33]}$$

$$i = 1, 2$$

Here, N represents the size of a window. When all $W_i$ values calculated as described above are smaller than a critical value, the first IMM fault detection block 120 generates only an actuator-fault model filter to detect an actuator-fault only, not detecting a sensor-fault. However, when any one of two exceeds the critical value, data of the sensor module corresponding to $S_i$ larger than the critical value enters the first IMM fault detection block 120 again so that sensor-fault detection is performed.

The first IMM fault detection block 120 includes a sensor filter module 121, an upper level actuator filter module 122, and an actuator-fault decision making part 123. The first IMM fault detection block 120 detects faults of the sensor and the actuator using an IMM estimation technique.

The sensor filter module 121 includes first to $N^{th}$ sensor filters 121a, 121b, . . . , 121n. The respective sensor filters 121a, 121b, . . . , 121n are sensor-fault model filters. The sensor filter module 121 calculates probabilities of the respective sensor filters, and transmits the calculated probabilities of the model filters to the sensor-fault determination part 115 of the HU fault detection block 110.

Figure 5B:
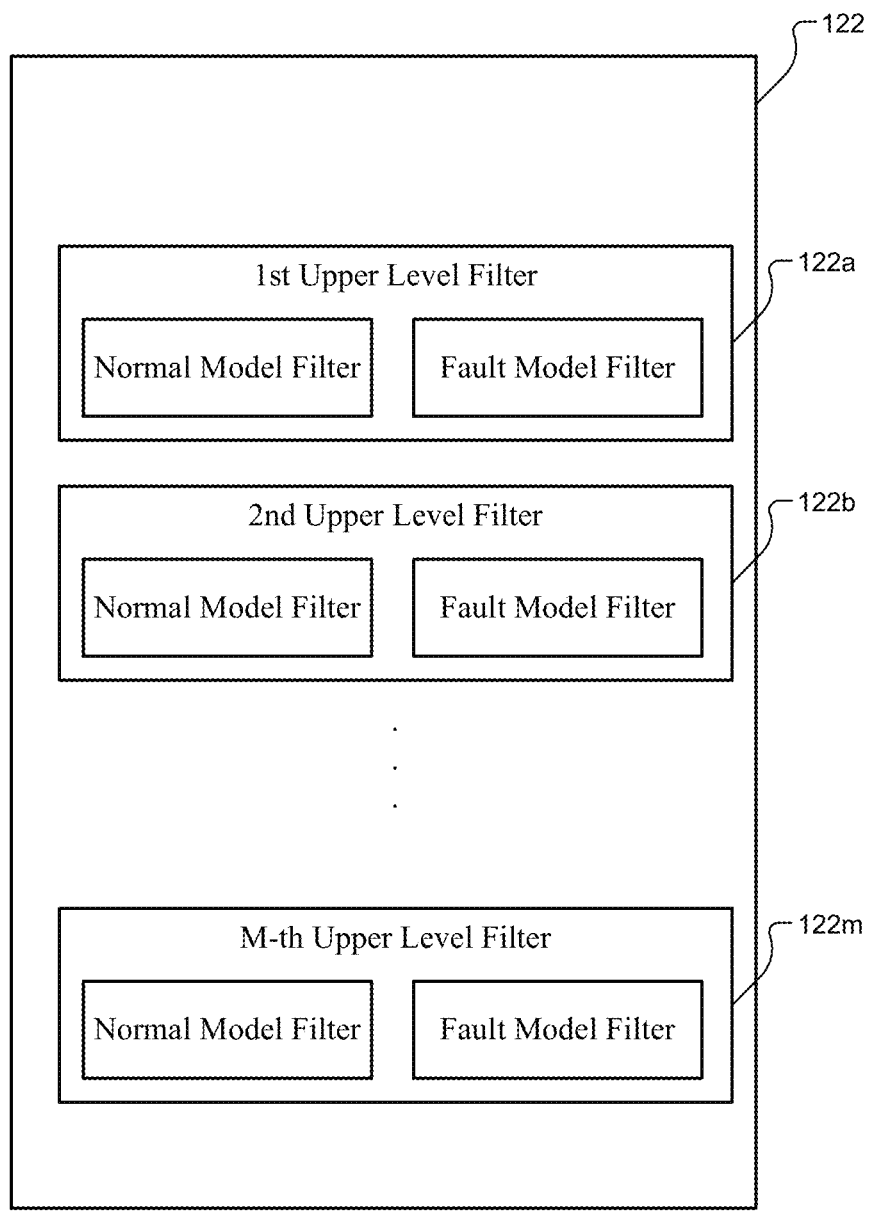
FIG. 5b is a block diagram of an upper level actuator filter module in accordance with the exemplary embodiment of the present invention.
Figure 5C:
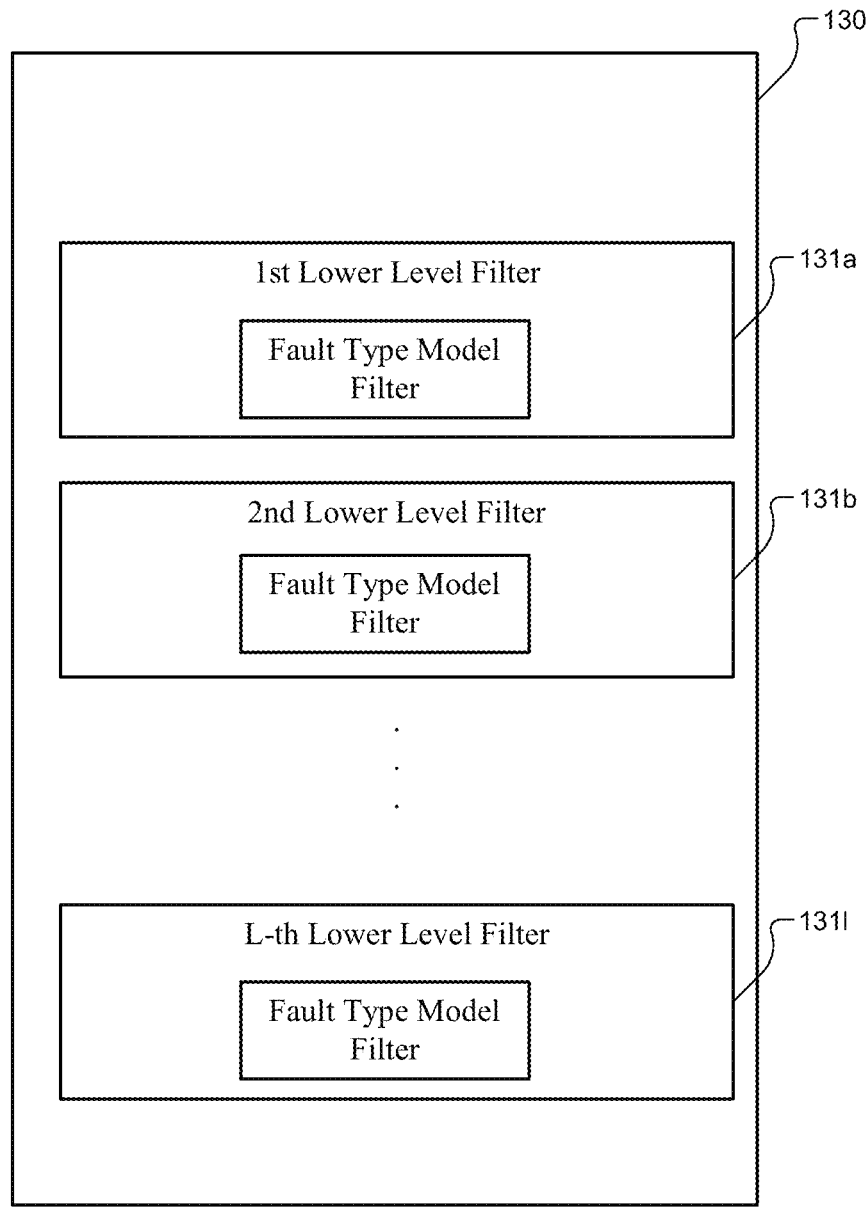
FIG. 5c is a block diagram of a lower level actuator filter module in accordance with the exemplary embodiment of the present invention.

The upper level actuator filter module 122 includes first to $M^{th}$ upper level filters 122a, 122b, . . . , 122m corresponding to the actuators, respectively. The upper level filters 122a, 122b, . . . , 122m each include one or more normal model filters corresponding to one of the actuators and one or more fault model filters corresponding to the one of the actuators, as shown in FIGS. 5B and 5C.

The actuator-fault decision making part 123 detects faults of the actuators using data from the upper level actuator filter module 122.

The second IMM fault detection block 130 includes a lower level actuator filter module 131 and a fault type decision making part 132.

The lower level actuator filter module 131 includes first to $L^{th}$ lower level filters 131a, 131b, . . . , 131l. The first to $L^{th}$ lower level filters 131a, 131b, . . . , 131l are fault model filters according to fault types of the fault-detected actuators.

The fault type decision making part 132 determines a fault type using data from the lower level actuator filter module 131.

The IMM filter for actuator-fault detection will be described below in detail.

The fault detection method using the IMM filter technique is a method of detecting a fault using a residual between a measurement value measured through a sensor and an estimation value of a fault-predicted filter. The simplest method is to declare a fault when the magnitude of the residual exceeds a predetermined critical value. However, such a method is likely to generate a false alarm since an instant abnormality or noise of the sensor is recognized as a fault even when an actual fault does not occur. Therefore, instead of the above method, a method of detecting a fault using reliability information of a multiple model is used. That is, since the reliability information of each model shows relevance between the current system model and each model, the information may be applied to the fault detection technique. The fault detection method using the reliability is performed through the following equation 34.

$$\mu_j(k+1) = \max \mu_j(k+1) \begin{cases} > \mu_T \Rightarrow H_j: \text{fault } j \text{ occurred} \\ < \mu_T \Rightarrow H_j: \text{no fault} \end{cases} \quad \text{[equation 34]}$$

Here, µ represents reliability showing similarity between each fault model and the actual system. Therefore, when reliability $\mu_j$ of a specific fault model is increased to exceed a critical value $\mu_T$, a fault is declared. The fault detection method using the IMM determines the fault when $\mu_j$ obtained through the residual between the fault system and the model is larger than the predetermined critical value. If the magnitude of the fault is large, a difference between the respective models is larger so that the fault can be rapidly detected. However, if the magnitude of the fault is small and variation in residual due to the fault is also small, the fault can be detected under the condition that the residuals are accumulated. Therefore, a predetermined time is needed until $\mu_j$ exceeds $\mu_T$. This means that there is a disadvantage of delaying the fault detection even when the fault occurs. For this reason, in this embodiment, in order to reduce a fault detection time, which is a disadvantage of the fault detection method using the conventional IMM filter, and to increase detection performance of a relatively small fault, a penalty is used to the µ value. That is, it is intended to reduce the detection time using the penalty in comparison with the fault detection method using the conventional IMM filter technique. In order to calculate $\mu_j$ using the penalty, µ of the conventional IMM filter is first calculated.

A likelihood function for calculating $\mu_j$ in the IMM filter is as the following equation 35.

$$L_j(k+1) = \frac{1}{\sqrt{|(2\pi)S_j(k+1)|}} \exp\left[-\frac{1}{2} v_j^T(k+1) S_j^{-1} v_j(k+1)\right], \quad \text{[equation 35]}$$

$$j = 1, 2, \ldots N$$

Here, $v_j$ represents a residual obtained through a measurement value and an estimation value, and $S_j$ represents a covariance of a residual. $\mu_j$ of each model is obtained through Equation 36. The number of models is j, and each model is designed on the basis of each fault situation.

$$\mu_j(k+1) = \frac{\mu_j(k+1 \mid k) L_j(k+1)}{\sum_{1}^{N} \mu_j(k+1 \mid k) L_j(k+1)} \quad \text{[equation 36]}$$

$$j = 1, 2, \ldots N$$

Reliability of each fault model is constituted by a vector as in the following equation 37.

$$\underline{\mu}=[\mu_1(k+1)\mu_2(k+1)\mu_3(k+1)\ldots\mu_N(k+1)] \qquad \text{[equation 37]}$$

In order to detect a fault, reliability of a model having the largest value of $\mu$ is obtained. Then, the reliability and the fault detection critical value are compared, and it is determined as a fault when the reliability of the fault model is larger than the critical value.

$$\underline{\mu}_{FDD_{max}} = max_j\{\mu_j(k+1)\} \qquad \text{[equation 38]}$$
$$j = 1, 2, \ldots N$$

$$\underline{\mu}_{FDD_{max}} > \mu_T \qquad \text{equation [39]}$$

The fault detection method using the IMM filter technique detects the fault through the following operations. In this embodiment, a penalty is multiplied to exp{ } used when a likelihood function is calculated to reduce a convergence time of $\mu$. That is, since residuals of the respective models are relatively increased when the penalty is multiplied to residuals between the actual system and the respective models, the convergence time of $\mu$ is reduced and thus a fault response speed is increased. Since the fault can be more rapidly detected using the penalty than the conventional IMM filter, fault separation and recovery can also be rapidly performed. In addition, since rapid fault detection means high sensitivity to the fault, the fault detection can be performed in a stepped manner using the penalty. This means that a disadvantage related to a large amount of calculation in the IMM filter can be overcome.

An operation of the embodiment shown in FIG. 5a will be described below in detail.

First, when a fault occurs from a sensor, for example, when a bias type fault occurs from an X-axis gyro of the second sensor module SM2, a sensitivity factor of the second local filter 111b of the FKF fault detection block 110 is increased. Sensor data of the second local filter 111b is transmitted to the sensor filter module 121 of the first IMM fault detection block 120. The sensor filter module 121 of the first IMM fault detection block 120 generates sensor filters of the respective fault models of an X-axis gyro, a Y-axis gyro and a Z-axis gyro of the second sensor module SM2. The sensor filter module 121 calculates fault probabilities using the respective sensor filters, and transmits the data to the sensor-fault decision making part 115 of the FKF fault detection block 110, performing a first sensor-fault detection operation. The sensor-fault decision making part 115 of the FKF fault detection block 110 detects and separates a fault of the X-axis gyro of the second sensor module SM2 to perform a second sensor-fault detection operation on the basis of the sensitivity factors of the respective filters 111a and 111b received from the sensitivity factor calculation part 112 and the data transmitted from the sensor filter module 121 of the first IMM fault detection block 120. When the sensor-fault detection is completed, the first IMM fault detection module 120 receives the sensor data of the first local filter 111a, which does not malfunction, to detect the fault of the actuator. The fault detection of the actuator is similar to a fault detection process of the actuator included in the following paragraph.

Next, when only the actuator malfunctions without the sensor-fault, for example, when a soft fault in which only 25% of the original performance of the second reaction wheel is actuated occurs, a difference between fault reliabilities of the first and second local filters 111a and 111b of the FKF fault detection block 110 is not large. Since the fact that there is a small difference between the fault reliabilities between the two local filters 111a and 111b means that the sensor does not malfunction, data of only an arbitrary one of the two sensor modules SM1 and SM2 is transmitted to the upper level actuator filter module 122 of the first IMM fault detection module 120. The upper level actuator filter module 122 generates filters of models related to the faults of the reaction wheels. Probability of the fault model filter of the second reaction wheel of the upper level actuator filter module 122 exceeds a critical value. Therefore, the actuator-fault decision making part 123 declares the fault of the second reaction wheel. Next, the related data is transmitted to the lower level actuator filter module 131 of the second IMM fault detection block 130. The lower level actuator filter module 131 generates two lower level filters of the hard fault and the soft fault of the second reaction wheel, and the fault type decision making part 132 determines the soft fault of the second reaction wheel through probability calculation of each fault model.

Hereinafter, simulation results for performance verification of an embodiment in accordance with the present invention will be described.

Figure 6:
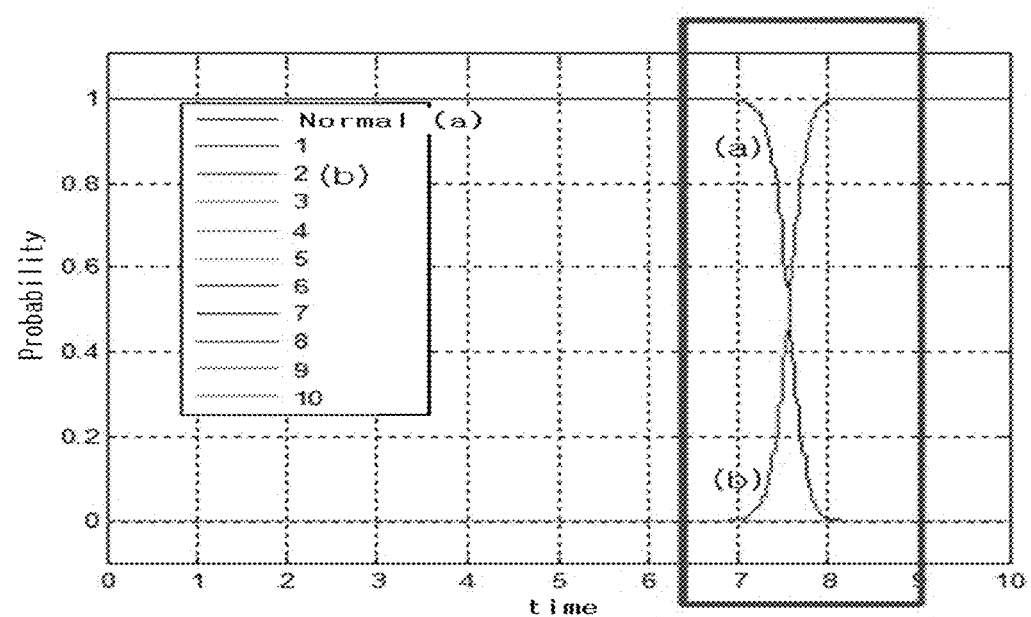
FIG. 6 is a graph showing simulation results of variation in probability of a model filter when a penalty is used in accordance with the exemplary embodiment of the present invention.
Figure 7:
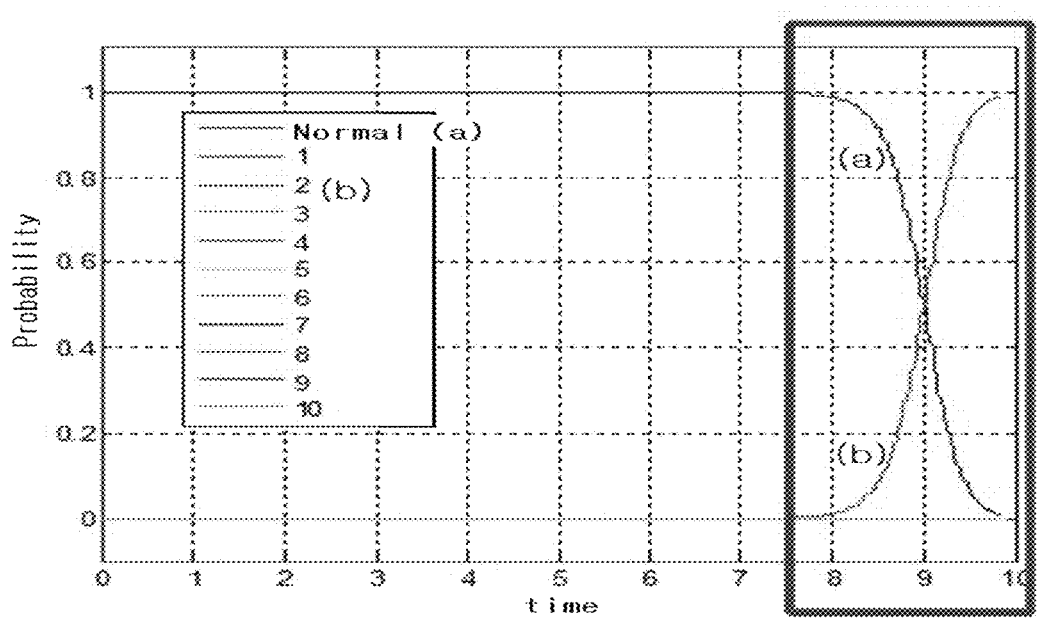
FIG. 7 is a graph showing simulation results of variation in probability of a conventional model filter in which a penalty is not used.

First, simulation results of fault detection performance using a penalty will be described. The case in which the first to third reaction wheels are actuated to change the attitude of the satellite and the second reaction wheel malfunctions after 5 seconds will be described. The number of model filters is eleven including four fault models of reaction wheels, six thruster fault models in + and − directions, and one normal model. A probability variation graph of IMM using a penalty in accordance with an exemplary embodiment of the present invention in the case of the soft, fault in which only 1% of a normal output is generated is shown in FIG. 6, and a probability variation graph of the conventional IMM not using a penalty is shown in FIG. 7. In FIGS. 6 and 7, it will be appreciated that while there is no fault, a normal probability line (a) maintains 1, and when the second reaction wheel malfunctions, probability of a line (b) of the second fault model is gradually increased to exceed the critical value. However, it will be, appreciated that the technique using the penalty can more rapidly detect the fault when the method using the penalty in FIG. 6 and the method not using the penalty in FIG. 7 are compared. This is because a convergence time of the fault probability is reduced when the likelihood function is calculated using the penalty and the probability more rapidly exceeds the fault critical value.

Figure 8:
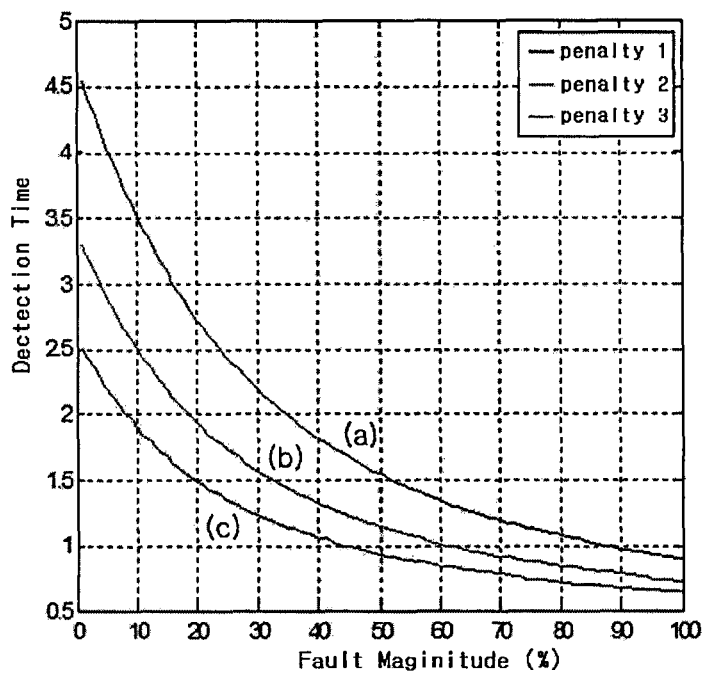
FIG. 8 is a graph showing simulation results of fault detection performance according to variation in penalty.

FIG. 8 is a graph showing simulation results of fault detection performance according to variation in penalty. Referring to FIG. 8, a line (a) not using a penalty, a line (b) using a penalty of 2, and a line (c) using a penalty of 4 represent variation in detection time with respect to the magnitudes of the respective faults. As shown in FIG. 8, the less the magnitude of the actuator fault, the better the fault detection performance of the technique using a large penalty.

Figure 9:
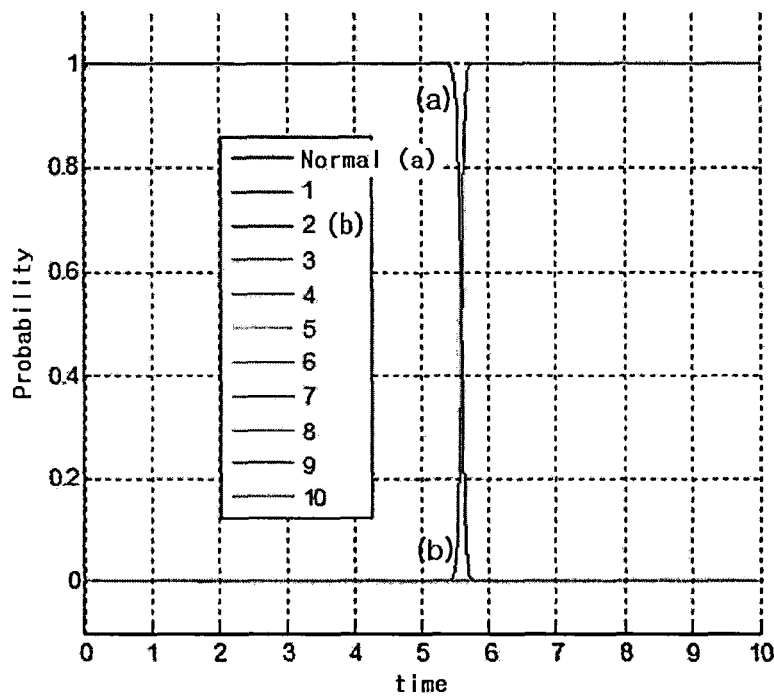
Figure 10:
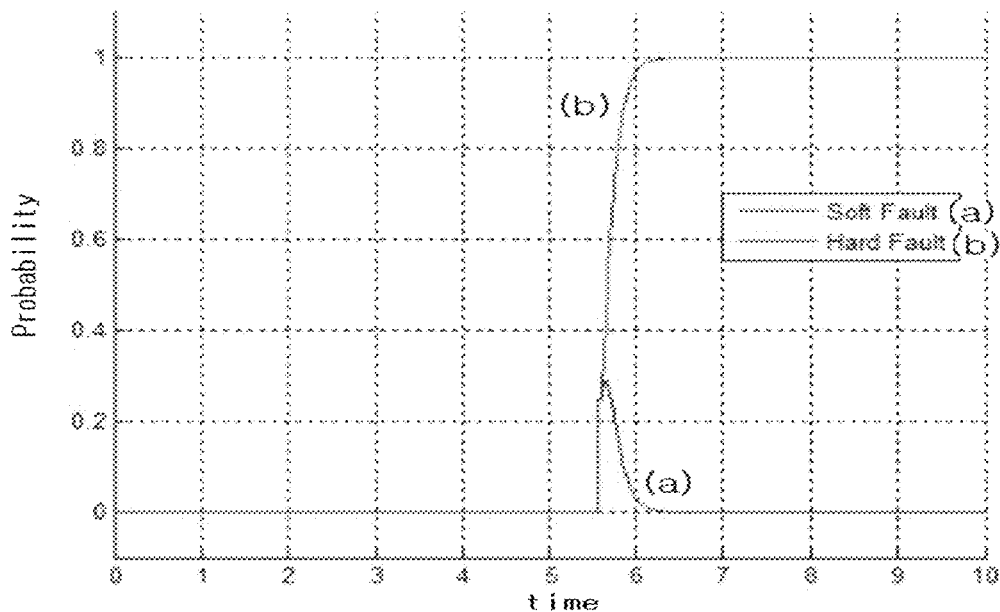

As shown in FIG. 5a, the actuator-fault detection process of the embodiment includes a first detection operation in the first IMM fault detection block, and a second detection operation in the second IMM fault detection block. In order to check performance of the actuator-fault detection process in two steps, the case in which a hard fault of the second reaction wheel occurs after 5 seconds is simulated, and the results are shown in FIGS. 9 and 10. First, in the first detection operation, the fault of the second reaction wheel is detected using eleven models including ten fault models and one normal model of the actuator as shown in FIG. 9. Next, in the second detection operation, a hard fault of the second reaction wheel is detected using two models including a soft fault model and a hard fault model of the second reaction wheel as shown in FIG. 10.

Figure 11:
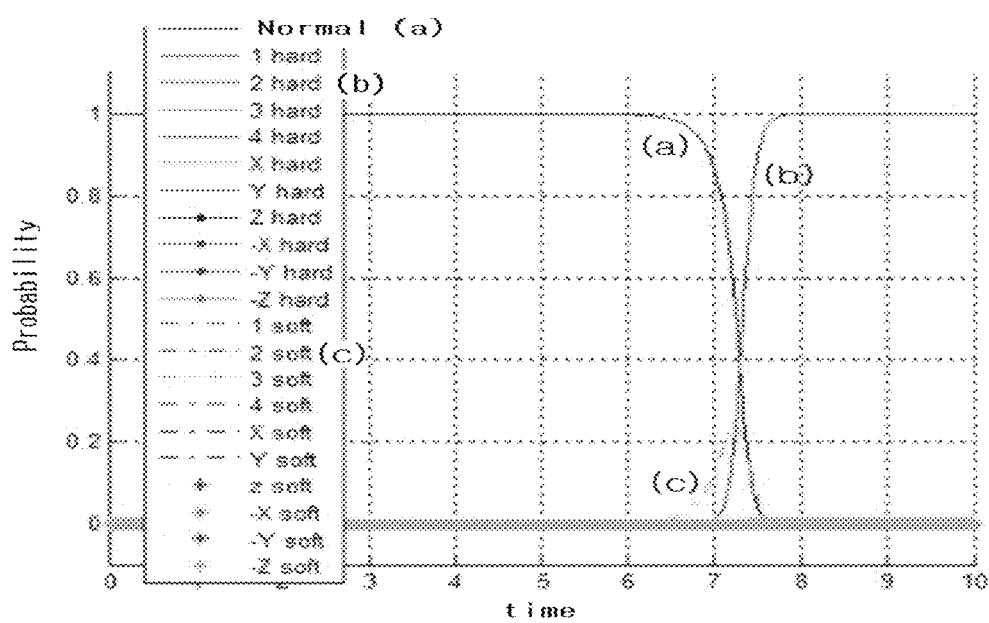
FIG. 11 is a graph showing simulation results of a conventional actuator-fault detection method.

FIG. 11 is a graph showing simulation results of a conventional actuator-fault detection method. In this case, 21 fault models including 10 hard fault models, 10 soft fault models and 1 normal model are simultaneously generated and used. Referring to FIG. 11, it will be appreciated that probabilities of the hard fault model and the soft fault model of the second reaction wheel are simultaneously increased at the beginning of the fault detection. While this result is natural since the fault models are from the same actuator, an accurate fault detection time may be further delayed.

Table 1 compares detection times of the fault detection separation technique using the conventional IMM and the fault detection separation technique using a two-step IMM in accordance with the embodiment. As can be seen from Table 1, the fault detection separation technique using the two-step IMM in accordance with the embodiment can more rapidly detect the fault type than the conventional technique.

TABLE 1

|  | Fault detection separation using IMM | Fault detection separation using two-step IMM |
|---|---|---|
| Fault detection separation | 7.32 seconds | 5.57 seconds |
| Fault type separation | 7.32 seconds | 5.86 seconds |

Figure 12:
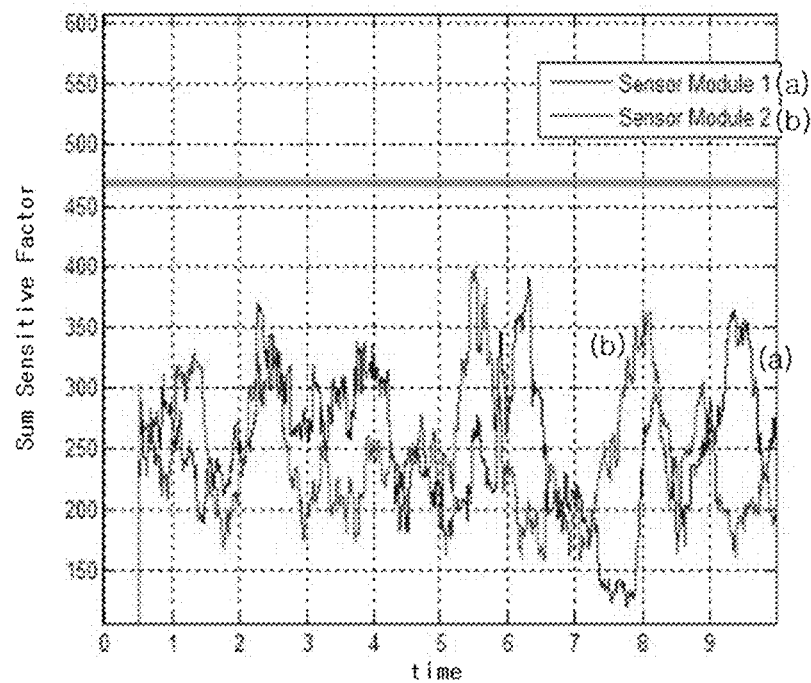
Figure 13:
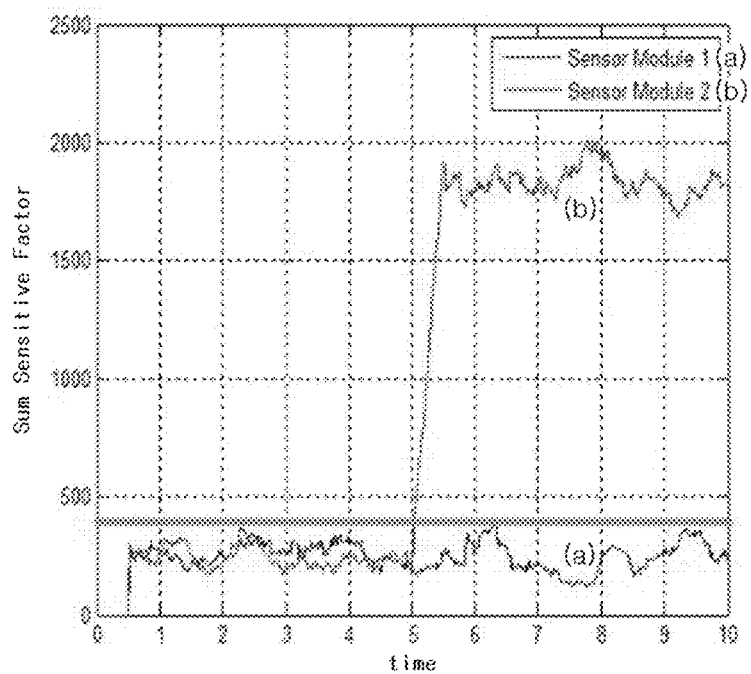
Figure 14:
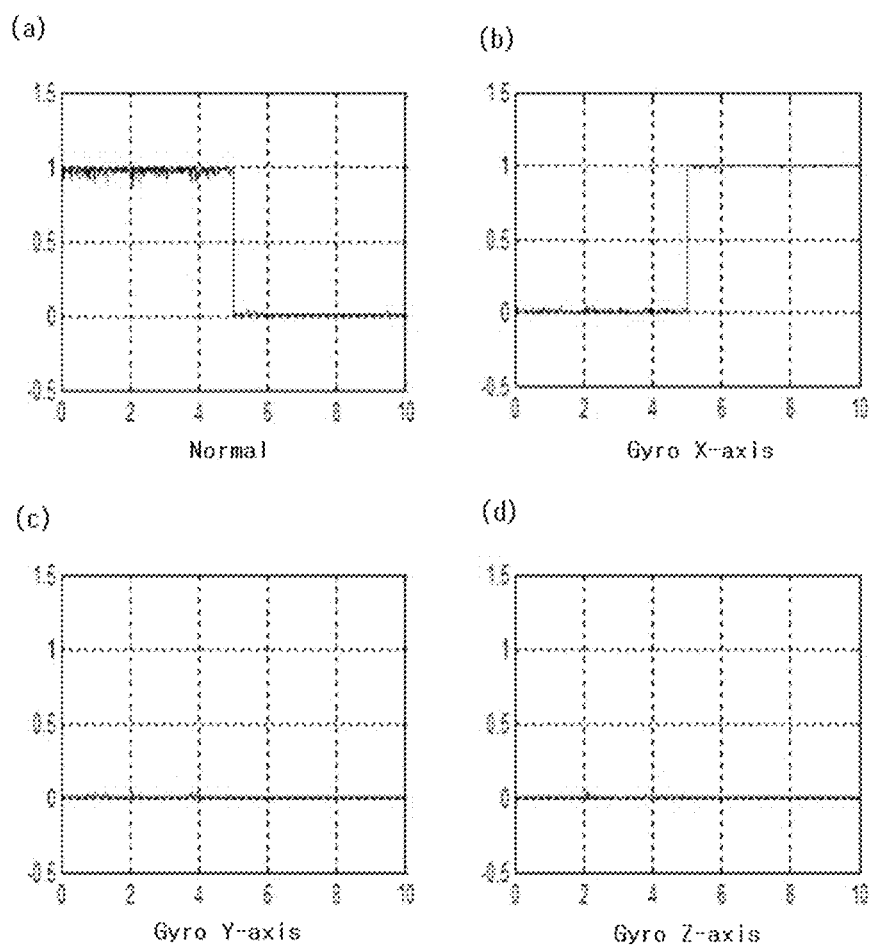

FIGS. 12, 13 and 14 are graphs showing simulation results of sensor-fault detection using the fault detector shown in FIG. 5a.

FIG. 12 shows the case in which there is no sensor-fault, and both of a sensitivity factor (a) of the first sensor module and a second sensitivity factor (b) of the second sensor module are smaller than a critical value.

FIGS. 13 and 14 shows the simulation results when the X-axis gyro sensor of the second sensor module malfunctions after 5 seconds. Referring to FIG. 13, it will be appreciated that the sensitivity factor (b) of the second sensor module SM2 in the FKF fault detection block 110 exceeds the critical value. Sensor module data of the second sensor module SM2 is transmitted to the first IMM fault detection block 120 to calculate probabilities of the respective sensor filters generated in the sensor filter module 121. Probabilities of the respective models are shown in FIG. 14. As shown in FIG. 14, it will be appreciated that the probability of the normal model is maintained at 1 and then reduced after 5 seconds, the X-axis gyro fault model probability is increased, and Y- and Z-axis gyro model probabilities are maintained at 0.

As can be seen from the foregoing, since a fault detector of the present invention includes a first IMM fault detection block for performing a first actuator fault detection operation to find a faulted actuator, and a second IMM fault detection block for performing a second actuator fault detection operation to find a fault type of the faulted actuator, it is possible to minimize generation of model filters and thus reduce a fault detection time and improve performance thereof.

In addition, since the IMM estimation technique uses a penalty upon actuator-fault detection, it is possible to remarkably reduce a fault detection time.

Further, since the present invention includes an FKF fault detection block for calculating sensitivity factors of the respective sensor modules and comparing the magnitudes thereof, and model filters with respect to the respective sensor of the sensor module having a large sensitivity factor using the IMM estimation technique, faults of the sensors can be effectively detected.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A fault detector for an attitude control system (ACS) of a spacecraft including a plurality of actuators and a plurality of sensor modules, comprising:

a federated Kalman filter (FKF) fault detection block including: a plurality of local filters for receiving data from the plurality of sensor modules to calculate an estimation value of an attitude model of the spacecraft, a prediction filter of an attitude of the spacecraft, a sensitivity factor calculation part for calculating sensitivity factors of the respective local filters using data from the plurality local filters and data from the prediction filter, and a comparison part for comparing the sensitivity factors of the respective local filters, wherein the FKF fault detection block transmits data of the sensor module used in the local filter having a smallest sensitivity factor to an upper level filter of a first interacting multiple model (IMM) fault detection block;

the first interacting multiple model (IMM) fault detection block for generating a plurality of upper level filters each including normal model filters of the plurality of actuators and fault model filters corresponding to the respective actuators, and detecting faults of the plurality of actuators using an IMM estimation technique from the plurality of upper level filters; and a second IMM fault detection block for generating a plurality of lower level filters each including a fault type model filter of the fault-detected actuator in the first IMM fault detection block, and detecting a fault type of the failed actuator using the IMM estimation technique, wherein the IMM estimation technique uses a penalty upon calculation of reliability of each model filter.

2. The fault detector according to claim 1, wherein the plurality of actuators comprise four reaction wheels and six pairs of thrusters, and the fault model filters of the respective actuators of the plurality of upper level filters comprise fault model filters corresponding to the four reaction wheels and fault model filters corresponding to the six pairs of thrusters.

3. The fault detector according to claim 1, wherein the plurality of lower level filters comprise hard fault model filters and soft fault model filters of the failed actuator.

4. The fault detector according to claim 1, wherein the first IMM fault detection block generates a plurality of sensor filters including fault model filters with respect to the respective sensors of the sensor module corresponding to the local filter having a largest sensitivity factor, and the FKF fault detection block transmits the data of the sensor module used in the local filter having the largest sensitivity factor to the plurality sensor filters, and detects a fault of the sensor using the sensitivity factor and the data from the plurality of sensor filters.

5. The fault detector according to claim 1, wherein the sensor module comprises an X-axis gyro, a Y-axis gyro and a Z-axis gyro, and the plurality of sensor filters comprise a fault model filter of the X-axis gyro, a fault model filter of the Y-axis gyro, and a fault model filter of the Z-axis gyro.

6. A fault detection method for an attitude control system (ACS) of a spacecraft including a plurality of actuators, comprising:

a first actuator-fault detection operation of generating a plurality of upper level filters each including normal model filters of the plurality of actuators and fault model filters corresponding to the respective actuators, and detecting faults of the plurality of actuators using an interacting multiple model (IMM) estimation technique; and a second actuator-fault detection operation of generating a plurality of lower level filters corresponding to fault types of the fault-detected actuators in the first actuator-fault detection operation, and detecting the fault type of the failed actuator using the IMM estimation technique, wherein the IMM estimation technique uses a penalty upon calculation of reliability of each model filter.

7. The fault detection method according to claim 6, wherein the spacecraft comprises a plurality of sensor modules, and the method comprises:

a first sensor-fault detection operation of receiving data from the plurality of sensor modules to calculate estimation values of attitude models of the spacecraft and a prediction value of an attitude of the spacecraft, and calculating and comparing sensitivity factors of the respective estimation values using the values; and a second sensor-fault detection operation of generating a fault model filter of each sensor of the sensor module used to calculate the estimation value having a largest sensitivity factor, and detecting a fault of an individual sensor using the IMM estimation technique on the basis of data of the sensor module used to calculate the estimation value having the largest sensitivity factor.

8. The fault detection method according to claim 7, wherein the data of the sensor module used to calculate the estimation value having the smallest sensitivity factor among the sensitivity factors is transmitted to the first actuator-fault detection operation.

* * * * *